March 14, 1967     S. J. HOLTZMAN     3,309,451

LUGGAGE MANUFACTURE

Filed Nov. 1, 1963     4 Sheets-Sheet 1

INVENTOR.
SAMUEL J. HOLTZMAN
BY
*Harry S. Shapiro*
ATTORNEY

INVENTOR.
SAMUEL J. HOLTZMAN
BY
Harry G. Shapiro
ATTORNEY

March 14, 1967  S. J. HOLTZMAN  3,309,451
LUGGAGE MANUFACTURE
Filed Nov. 1, 1963  4 Sheets-Sheet 3

INVENTOR.
SAMUEL J. HOLTZMAN
BY
*Harry G. Shapiro*
ATTORNEY

March 14, 1967  S. J. HOLTZMAN  3,309,451
LUGGAGE MANUFACTURE

Filed Nov. 1, 1963  4 Sheets-Sheet 4

INVENTOR.
SAMUEL J. HOLTZMAN
BY
Harry G. Shapiro
ATTORNEY

United States Patent Office 3,309,451
Patented Mar. 14, 1967

3,309,451
LUGGAGE MANUFACTURE
Samuel J. Holtzman, 8201 Symphony Drive,
Baltimore, Md. 21208
Filed Nov. 1, 1963, Ser. No. 320,636
11 Claims. (Cl. 264—258)

The invention relates to the adhesion of textile fabrics to polypropylene, and is more particularly directed to the manufacture of shells molded of polypropylene for luggage or the like.

Polypropylene compounds are readily available as products of commerce. Polypropylene may be described as an alpha-olefin polymer having a molecular structure which is stereoregular, crystalline or isotatic, the latter term describing a molecular structure in which all of the methyl groups occur on the same side of the plane of the hydrocarbon chain. Polypropylene of commerce averages about 95% isotatic structure.

The invention utilizes polypropylene compounds suitable for injection molding and for textile fabrics, either woven or knitted. In the manufacture of shells for luggage by injection molding, a high impact strength type of polypropylene compound is used, such compounds generally comprising a blend of polypropylene with a minor amount of another material or additive which serves to improve the low temperature impact strength of the polypropylene. Various additives have been used for this purpose, such as butyl rubber, polyisobutylene, and ethylene-propylene copolymer rubber, the additive being present in amounts ranging from approximately 10 to 25% by weight of the polypropylene. For extrusion into filaments for the fabrication of yarn and woven or knitted fabrics therefrom, the polypropylene fiber is chemically the same as the polypropylene resin. High impact strength polypropylene for the injection molding of luggage shells, and the polypropylene used as the fiber of textile fabrics are well known products of commerce, and need not be further specified for purposes of the present invention. The dyeing of polypropylene fiber for fabrication into yarn and woven and knitted fabrics is disclosed for example in Patents Nos. 3,056,643, 3,101,-522 and 3,104,150.

Luggage made with shells which are formed by injection molding polypropylene has been well received commercially. Polypropylene has an unusually good balance of physical and chemical properties for luggage, containers, receptacles, or the like. Shells molded of polypropylene are rigid, dimensionally stable, and provide unusually high impact strength over a wide range of temperatures. The resin may be pigmented to furnish a variety of pleasing colors and in molding furnishes attractive surface appearance. Insofar as luggage is concerned, polypropylene possesses the important quality of being unusually light in weight, the specific gravity of the molded product being 0.905. From the strandpoint of its chemical properties, polypropylene furnishes excellent resistance to most solvents, greases, oils and most of the common chemicals, thereby furnishing resistance to staining both when in the form of a molded product or when woven or knitted into textile fabric.

Since the introduction of luggage molded of polypropylene, it has been desired to provide a lining for the shells molded of such resin. Users of luggage have been accustomed to carrying or travelling cases which are lined, and it has been particularly desirable to provide women's luggage with a textile fabric lining for the appearance and texture which a fabric affords.

It has been the practice in the art to line luggage cases by adhesively securing a lining to the inside of the case sections, or to use mechanical means such as rivets for the connection. Where rivets or the like have been used to secure the lining in place, and for a product of good quality and satisfactory appearance, it has been necessary to conceal the portions of the rivets which extend through the case sections and are exposed at the outer surface. Such concealment has generally been accomplished by adhesively uniting a surface layer of plastic sheeting to the outside of each case section. Polypropylene however is not receptive to adhesives, and prior art methods for lining a case cannot be used for luggage shells molded of polypropylene.

The unreceptiveness of polypropylene to adhesives or coatings is recognized in the art as indicated for example in Hirt 2,998,324, granted Aug. 29, 1961. Although this patent describes a procedure for coating polypropylene, the operational steps and the chemicals required are too painstaking and costly for use in luggage manufacture. Moreover, whether adhesive or mechanical means or both are used to secure a lining within the case sections, and aside from the cost of the lining itself, the cost of manufacturing the product is increased by the cost of the labor and equipment required to incorporate the lining in the case. Also, practically all adhesives are less than permanent in the sense that eventually they dry out and result in a separation of the lining from the part to which it is desired that it stick.

In accordance with the invention, a textile fabric is bonded directly to polypropylene without any preliminary treatment of the fabric or application of adhesive. The adhesion of the textile fabric to the polypropylene is accomplished in the self-same operation of molding the polypropylene to desired shape, thereby simultaneously permanently shaping the textile fabric to the desired contour. The adhesion of the fabric to the polypropylene is accomplished through the medium of the polypropylene molding composition itself, and the direct bond between the molded polypropylene and the textile fabric is of such strength that it is practically impossible to separate the fabric from the formed layer of resin. Moreover, the adhesion of the fabric to the polypropylene is confined to the side of the fabric which adjoins the molded polypropylene so that the exposed surface of the fabric retains the texture, feel, and appearance of a textile fabric.

As will be apparent from the more detailed description which will subsequently appear, the ability to strongly adhere a fabric to one side of a molded polypropylene article for the purposes of providing a lining therefor, also enables providing a luggage shell with a most securely bonded covering of textile fabric on its exposed or outer side. Although rigid luggage shells made by the injection molding of polypropylene furnish a pleasing appearance in that a variety of colors are available in the plastic material and the exposed surfaces may be molded to furnish pleasing designs, the ability to weld or permanently bond a fabric to polypropylene in accordance with the invention permits injection molded luggage to be made with a variety of textures, colors and designs which are as limitless as the variety of available textile fabrics. Further, and in accordance with the preferred form of the invention, when a textile fabric made of polypropylene fiber is used, the resistance to staining and marring is equally as good as the injection molded material itself.

These, and other objectives and advantages of the invention will be apparent from the following detailed description, taken in conjunction with the drawings which illustrate a preferred embodiment of the invention, in which.

Figure 1:
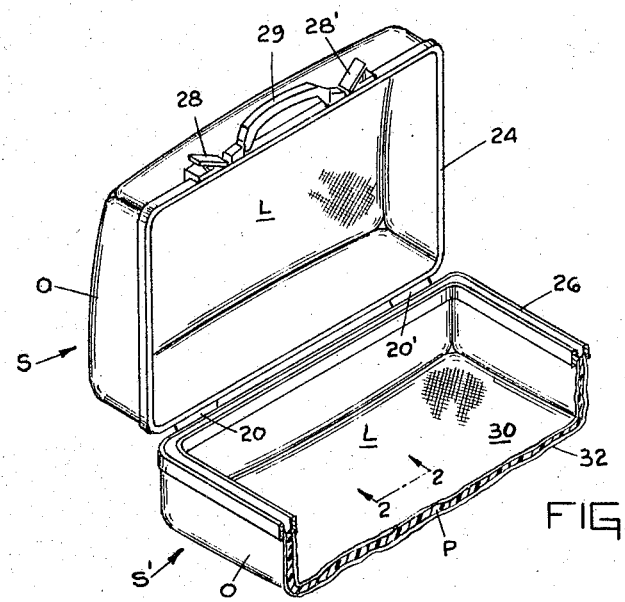
FIG. 1 is a perspective view, partly broken away and in section, showing a luggage case made in accordance with the invention.

The invention is particularly applicable to the manufacture of luggage, and FIG. 1 illustrates the invention as applied to a luggage case. The luggage case here shown comprises a pair of case sections or shells S and S' hinged to one another by a pair of laterally spaced hinges 20, 20'. The shell S is provided along its free peripheral edge with a valance member 24 adapted to be received, when the case is closed, in a channel or female valance member 26 secured to the free peripheral edge of the shell S'. The shell S is provided with a pair of laterally spaced locks 28 and 28' for cooperation with hasps (not shown) on the opposite shell. A handle 29 is secured to the valance member 24 intermediate the locks and, as is usual in the art, a divider (not shown) is hinged to one of the shells. As illustrated, the shells S and S' are essentially the same in configuration, being concavely shaped or hollow.

Each of the shells comprises a rigid layer P of polypropylene formed by injection molding. If desired, the shells S and S' may be made in the same mold assembly. In this illustrated embodiment of the invention, the molded polypropylene is provided both with a lining L of a textile fabric 30 and an outer surface covering O of a textile fabric 32. Without the lining and outer covering, the polypropylene injection molded shells and their relationship to one another as part of a luggage case and their hardware (locks, hasps, valance members, hinges and handle) are known in the art.

The invention resides in securely bonding a textile fabric to a layer or member of polypropylene, and more specifically in the provision of a lining for an injection molded polypropylene shell, the provision of a textile fabric outer surface covering for a shell so formed, and in the composite of both lining and outer surface covering for the shell. The character of the bond of the textile fabric to the formed rigid layer of polypropylene will be described later.

Figure 4:
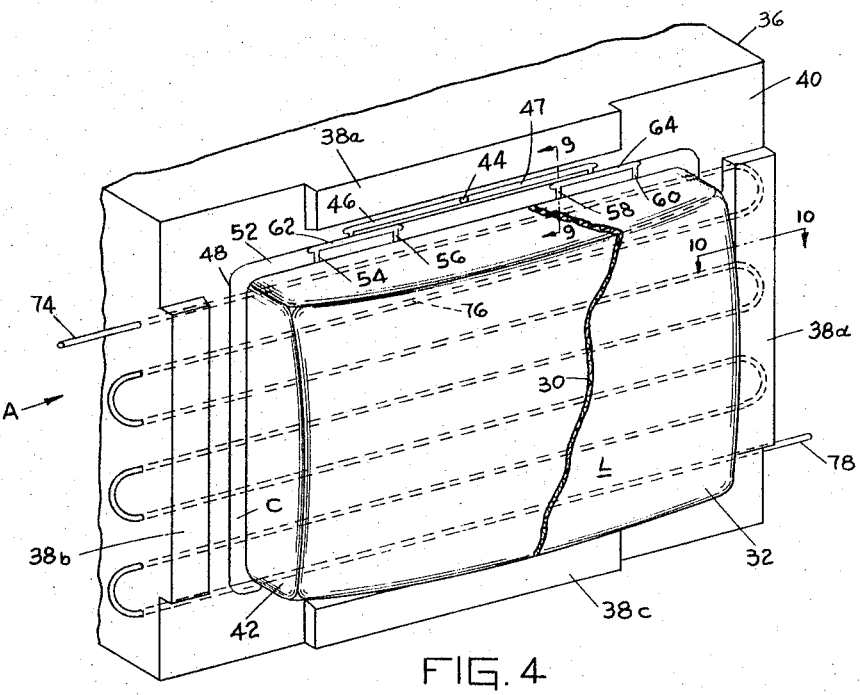
FIG. 4 is a perspective view of the male or core member of a mold assembly used for the injection molding of a luggage shell, this view showing a lining, partly broken away and in section, positioned on the mold member.
Figure 5:
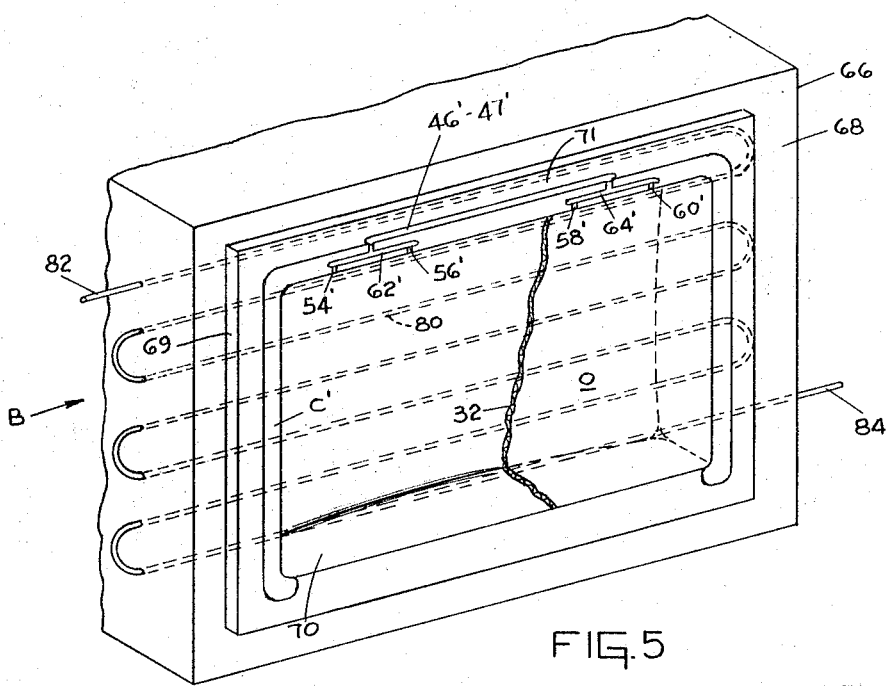
FIG. 5 is a perspective view of the female or cavity member of the mold assembly, this view also showing a fabric positioned therein when it is desired that the finished luggage shell possess an outer surface covering of fabric.

FIGS. 4 and 5 show the mating mold members of a mold assembly suitable for producing shells provided both with a lining and an outer surface covering. The male or core mold member A comprises a base 36 provided with the usual guide blocks 38a, 38b, 38c, and 38d extending upwardly from the face 40 of the base. The core portion 42 extends forwardly from the face of the base and possesses a configuration and dimensions which will furnish the desired configuration and dimensions of the inner surfaces of the shell to be molded. A sprue opening 44 extends through the base 36 for alignment with the nozzle of an injection molding machine (not shown) of suitable capacity. Machines suitable for the injection molding of polypropylene are well known in the art and do not constitute a part of the present invention. An injection molding machine which includes a screw action control and axial shifting of the screw, is best suited for the injection molding of polypropylene luggage shells. Machines of this type are standard commercially available equipment being shown generally in the patent to Willert 2,734,226, February 14, 1956.

As shown in FIG. 4, the sprue opening 44 is in communication with oppositely extending runners 46 and 47 formed in the face 40 of the mold member's base 36. The manner of molding is preferably accomplished by edge gating to thereby eliminate marring of the exposed surface of the finished shell where the shell is lined. Where the shell is also provided with an outer surface covering of textile fabric, edge gating is essential. It is within the scope of the invention to locate the gates in the face 40 of the base 36 and also to provide the connecting runners for communication with the runners from the sprue in such planar surface. To this extent, the same mold which is used to make a shell without a lining may be used without modification to produce a shell with a lining. In such case, the lining L may be maintained in desired position on the core portion 42 of the mold by imparting an electrostatic charge to the fabric of opposite polarity than the inherent charge on the mold. Electrostatic charging equipment is well known in the art and commercially available. Such equipment includes a wand or bar which when passed over the fabric will impart a charge to the fabric.

It is preferred however for uniformly good results to provide means for mechanically clamping the lining in place in the mold to assure that the fabric will be securely maintained at the area adjacent the gates, thereby eliminating the possibility of interference with the flow of the plastic material in its path over the lining and into the cavity. In accordance with the preferred embodiment of the invention, a clamp C (FIG. 6) is used to maintain the lining L on the core portion 42 and in exact relationship with respect to the gates. To accommodate the clamping means, the base 36 of the mold A is provided with a mating recess 48 immediately adjacent the periphery of the base of the core 42.

Figure 6:
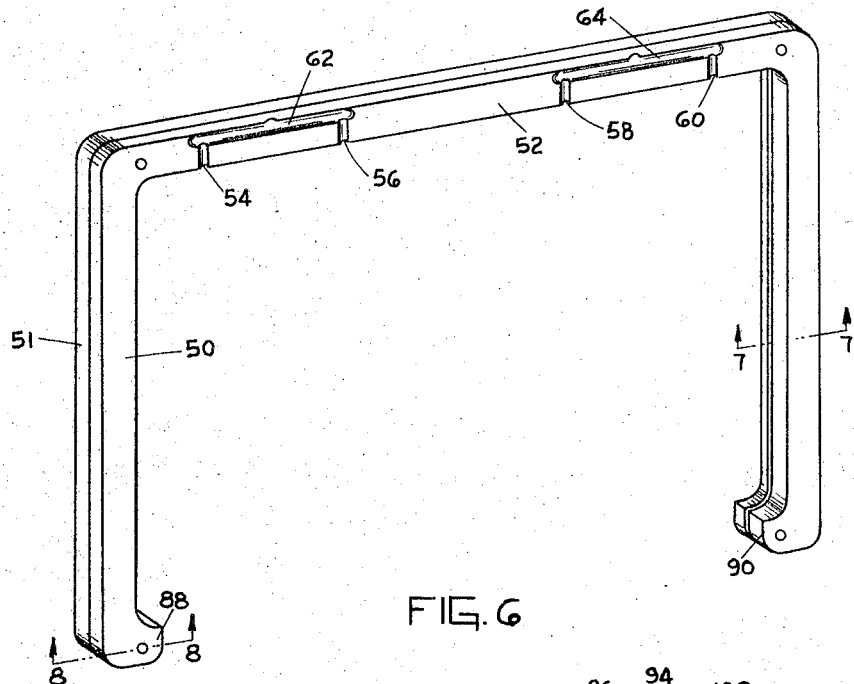
FIG. 6 is a perspective view of a clamp for the fabric which may be used in conjunction with the mold member of FIG. 4, such form of clamp also being suitable for use in conjunction with the female mold member of FIG. 5 when it is desired that the finished shell possess an outer surface covering of textile fabric.
Figure 7:
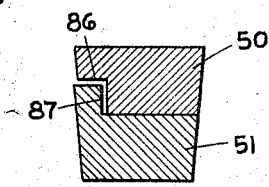
FIG. 7 is a horizontal cross-sectional view taken approximately in the plane of line 7—7 of FIG. 6.
Figure 8:
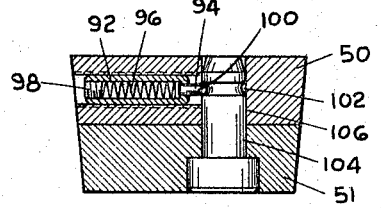
FIG. 8 is a view taken approximately in the plane of line 8—8 of FIG. 6 showing suitable means for separably connecting the members of the clamp of FIG. 6.

As shown in FIGS. 6, 7, and 8, the clamping means C comprises a pair of coextensive members 50 and 51 of identical outline. The clamp is substantially U-shaped. The member 50, which will be the exposed member when the clamp situated in the mold is provided along the base portion 52 thereof with gates 54, 56, 58, and 60. The number of gates depends upon the size of the piece being molded. The gates 54 and 56 are in communication with a horizontally extending runner 62, and the gates 58 and 60 with a runner 64. The runners 62 and 64 communicate with the runners 46 and 47 respectively leading to the sprue opening 44. As common in the art of molding, the runners and gates in one mold member are in the form of semi-circular grooves for cooperation with matching semi-circular grooves in the opposite mold member which are indicated by the same reference numerals primed.

The cavity mold member B for cooperation with the core mold member A is shown in FIG. 5 and comprises the base or block 66 having a front face 68 from which projects a substantially rectangular boss 69. A cavity 70 is formed in the base and within the boss of a shape and dimensions to furnish the contour and dimensions desired for the outer surface of the finished shell. The boss 69 is dimensioned to fit within the guide blocks 38a, 38b, 38c, and 38d, and to assure that the front face 71 of the boss will engage the face 40 of the mating mold member A when the mold assembly is closed. The core 42 on the male mold member and the cavity 70 on the female mold member are dimensioned to provide a spacing, when the mold is closed, which will furnish the desired wall thickness for the shell.

Where it is desired to provide a shell having an outer surface covering of fabric, it is preferred to make the mold member B so that it will also accommodate mechanical means for clamping the fabric which will provide the outer surface covering O. For this purpose, the boss 69 is provided with a recess 72 immediately adjoining the periphery of the cavity 70 to accommodate a second clamp, designated C'. This clamp, like the clamp C, is provided on the side exposed in the mold with halves of the gates and runners to mate with the like parts on the clamp C, such like parts of the clamp C' being referred to by the same reference numerals primed.

It will be understood that where it is desired to produce a lined shell without an outer covering, a cavity mold member may be used of the unmodified type in that the boss 69 is not provided with a recess for a clamp and the gate and runner halves are located in the upper horizontally extending portion of the boss's face 71 instead of in the clamp. The surface of the cavity 70 then furnishes the outer surface finish for the shell. Also, the usual unmodified male mold member may be used where it is desired to mold a shell with an outer textile fabric covering and without a lining. It will be further apparent that the illustrated arrangement of each mold member and associated clamp may be used for producing a lined shell only or a textile fabric covered shell only, as well as both a lined and outer fabric covered shell.

The mold members A and B are each provided with means for circulating a coolant therethrough. In the male mold member, a conduit 74 in communication with the source of coolant carries water through a serpentine passage 76 extending back and forth through the mold to discharge through the conduit 78. Similarly, the female mold member B is provided with a passage 80 for cooling fluid which is fed into the mold member through the conduit 82 and discharged at 84. The discharged coolant is recirculated back into the intake passages 74 and 82.

As will be evident from a viewing of FIGS. 6-10, the paired members 50 and 51 of clamp C, and similarly the members 50' and 51' of clamp C' are each formed along their inner longitudinal edges to grip the edge of the fabric positioned on the mold member. For this purpose, the clamp member 50 is made with a right-angled step 86 and the clamping member 51 is formed with a mating right-angled step 87. Thus, the peripheral edge of the fabric positioned on the mold is folded over and securely held on the top and sides of the core, and similarly immediately adjacent the cavity on the opposite mold member, where it is desired that the fabric be most securely held. Such three-sided holding of the fabric very adequately maintains the fabric snugly against the mold member where close contact with the mold member is needed; that is, particularly adjacent the gates.

Figure 9:
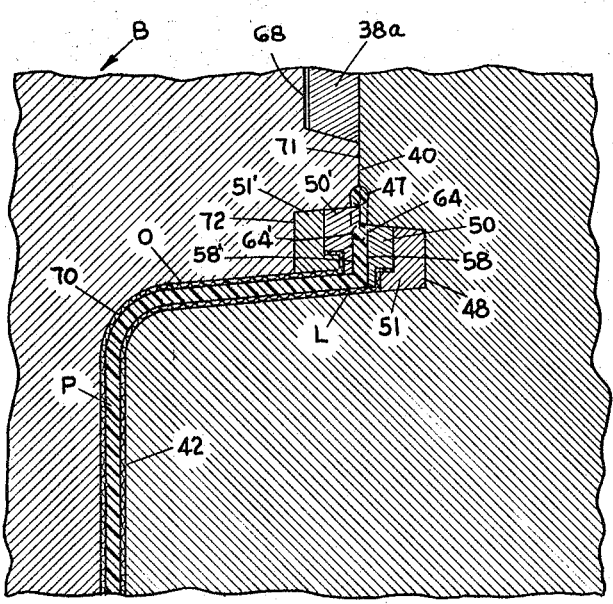
FIG. 9 is a vertical cross-sectional view taken approximately in the plane of line 9—9 of FIG. 4 to illustrate the manner of edge gating, this view also including the cooperating mold member of FIG. 5 and showing the assembly in closed position.
Figure 10:
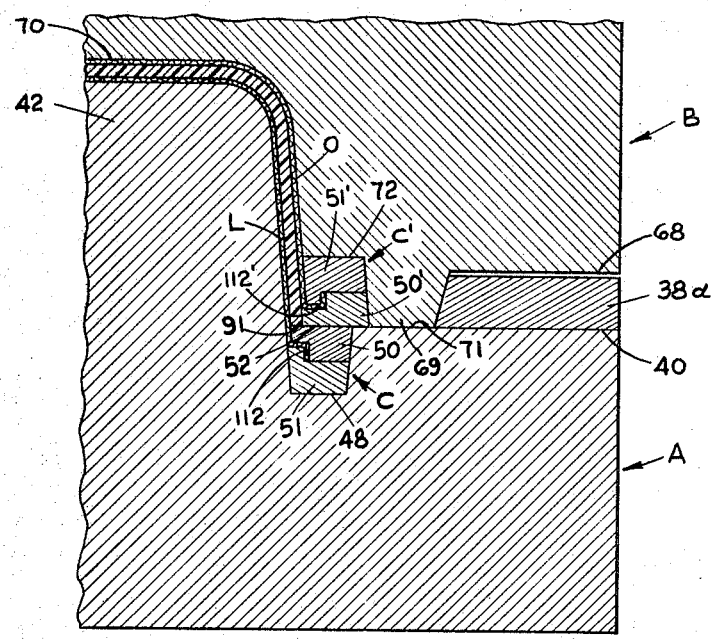
FIG. 10 is a horizontal cross-sectional view taken approximately in the plane of line 10—10 of FIG. 4, this view like FIG. 9 also showing the cooperating molding member of FIG. 5 and the mold in closed condition.

As shown in FIG. 9, the plastic material is injected into the mold over the lining L and under the outer surface covering O. Both the members 50 and 51, and their counterparts 50' and 51', are formed at their free ends with inturned portions 88 and 90 to closely fit around a short distance beneath the lower side of the core portion 42 of the male mold and lower side of the cavity portion 70 of the female mold. FIG. 10 shows the relationship of the clamps C and C' with respect to one another when the mold is closed. The forward edge of the face 52 of the clamping member 50 is located to define the free peripheral edge, designated 91, of the finished shell.

The clamp members of like clamps C and C' are separably connected by any suitable means. As shown in FIG. 8, a spring plunger arrangement may be used, there being one plunger near the free end of each arm of a clamp assembly. Spring plungers of this kind are known in the art and comprise a hollow body member 92 which is threaded on its outer surface for mating engagement with a threaded bore. Within the body 92, a plunger 94 is positioned and resiliently urged forward by a spring 96. The compression on the spring is adjustable by a set screw 98. The nose 100 of the plunger is located externally of the body 92. As here shown, the spring plunger arrangement is located in a bore provided in the clamping member 50 so that the nose 100 of the spring actuated plunger may cooperate with an annular groove 102 formed in the shank of a pin 104. The head of the pin is positioned in the clamping member 51 with the shank extending into a bore 106 in the clamping member 50. When the clamping members 50 and 51 are pushed together, the nose 100 of the plunger enters the groove 102 to hold the clamping members together. When the clamping members are grasped and pulled apart, the force of the spring 96 is overcome, permitting the nose of the plunger to withdrawn from the groove and allow separation of the clamping members.

Figure 3:
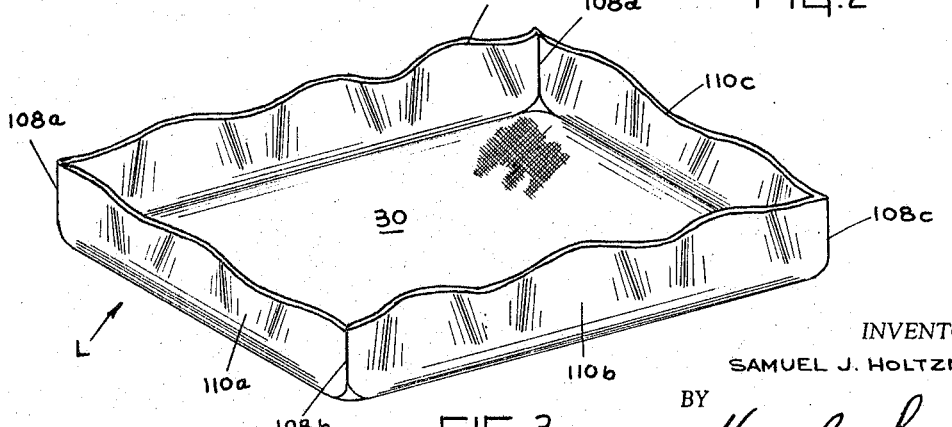
FIG. 3 is a perspective view of a textile fabric which has been preformed for insertion into a luggage shell mold and adherence to the plastic material being molded.

It is preferred to preliminarily shape or preform the textile fabric or fabrics which are positioned in the mold. To provide the lining L for the shell, a piece of flat goods 30 is cut to the proper overall dimensions, and then is cut at the corners and seamed to provide a contour as shown in FIG. 3. Where the woven or knitted fabric is of cotton or other vegetable or animal fiber, the seams at the corners 108a, 108b, 108c, and 108d are sewn. Where, as preferred, the textile fabric is of a polypropylene fiber, seaming is preferably accomplished by heat seaming as with a heated knife. The sides of the preformed lining 110a, 110b, 110c, and 110d are made of a height slightly longer than the sides of the finished shell, this extra small amount of material, approximately ¼ to ½ inch, constituting the portion which will be gripped between the steps 86 and 87 of the clamping members 50, 51. This small amount of waste fabric 112 will be trimmed after molding.

Figure 11:
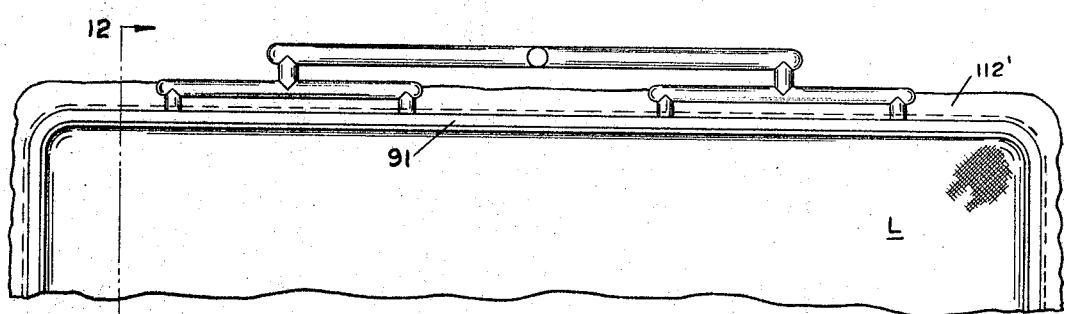
FIG. 11 is a rear elevational view, partly broken away, looking toward the inside of a finished molded lined and textile fabric covered shell when it leaves the mold and before the sprue, gates and connecting runners have been broken away.
Figure 12:
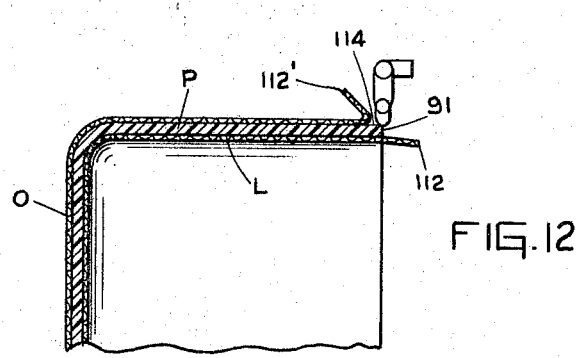
FIG. 12 is a vertical cross-sectional view taken approximately in the plane of line 12—12 of FIG. 11.

Similarly, a fabric length is cut to size and seamed to furnish the outer surface covering O, the peripheral edge of which is gripped by the clamp C' for positioning in the cavity 70 of the mold member B. The outer surface fabric O is preferably made to closely hug the adjoining surface of the cavity 70, and this may be accomplished by passing the bar of an electrostatic charger over the fabric clamped to the mold. The clamp C' assures that the shot as it passes through the gates will flow under the fabric of the outer covering O, just as the clamp C assures that the shot will cleanly pass over the fabric of the lining L. The small amount of waste fabric 112' is trimmed after molding and the sprue, runners and gates of plastic material as shown in FIGS. 11 and 12 are removed. The narrow area 114 along the outer peripheral edge of the molded shells which is not covered with fabric is concealed in the finished luggage case by the valance members 24 and 26.

After the lining L and the outer surface covering O are positioned on the respective mold members, the mold is closed and the shot is made. The temperature of the polypropylene molding compound when it is injected into the closed mold is approximately 535° F., and the molding compound is subjected to a pressure of approximately 1,750 lbs. per square inch within the closed mold. The temperature of the mold members, and due to the coolant irculated through the passages 76 and 80 in the respective mold members, is approximately 110° to 115° F. It would seem that with a molding composition having such temperature and at such pressure of molding that the resin would completely penetrate woven or knitted fabrics. However, it has been found that the resin does not completely penetrate the fabrics. This is apparently due to the differential which exists between the temperature of the composition as it enters the mold and the much lower temperature of the mold members of the mold assembly.

Figure 2:
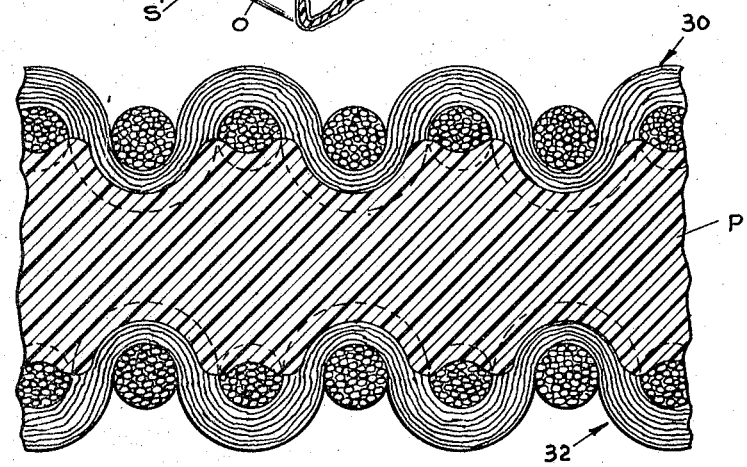
FIG. 2 is a vertical cross-sectional view on an enlarged scale, taken in the plane of line 2—2 of FIG. 1.

FIG. 2 illustrates the character of the bond at the interface of the textile fabric and molded layer of polypropylene. The polypropylene layer P adheres the fabrics 30 and 32 to itself directly and with an unusually high measure of adhesion. The plastic material flows into the interstices of the fabric and surrounds both the warps and the wefts (or courses and wales in a knitted fabric) for a portion of their diameters or outer peripheries. The adhesion of the fabrics to the resin layer is confined to the side of the fabric adjoining the formed layer of polypropylene. The exposed surface of each of the fabrics is free of the resinous material and retains the texture, color and appearance of the textile fabric. Where the textile fabric used is of a polypropylene fiber, there appears to be a slight amount of fusion at the interface of the fabric with the resin layer. However, whatever degree of fusion occurs at the fabric's interface with the resinous layer, the woven or knitted character and the texture, color and appearance of the textile fabric are retained. With fabrics of polypropylene fiber, the fabric cannot be separated from the molded layer of polypropylene.

As previously indicated, the textile fabrics may be woven or knitted and made of vegetable, animal, or synthetic resin fibers. It is preferred to use a woven fabric of polypropylene fiber because such fabric affords resistance to staining, furnishes an inseparable bond to the polypropylene layer and because a fabric of such fiber permits heat seaming of the corners in preforming the fabric for fitting onto a mold member. Also, fabrics of polypropylene fiber need not be as precisely fitted on the mold members as fabrics of cotton or other non-thermoplastic material; any slight creases in the fabric are fused to the injection molded polypropylene and blend in with the design of the fabric. For example, polypropylene fiber fabrics woven of 60 denier warp yarns and 14/1 spun filling yarns, 152×48, or with 210 denier warp yarns and the same size filling yarn, have been found to be most satisfactory for use in luggage manufacture.

It will be apparent that the adhesion of a textile fabric to a layer or member of polypropylene has numerous applications in addition to its application for the manufacture of luggage or the like. It is believed that the advantages of the invention will be apparent from the foregoing detailed description of a preferred embodiment thereof. It will be understood that various modifications and changes may be made without departing from the spirit and scope of the invention as sought to be defined in the following claims.

I claim:

1. A method of making a textile fabric surfaced concavely shaped molded shell for luggage or the like comprising providing a mold assembly having a cavity to furnish the molded shell when the mold is closed, providing a preformed textile fabric conforming substantially in shape and dimensions to the shape and dimensions of the finished shell, positioning the preformed textile fabric in the mold and maintaining the fabric against a mold member of the assembly, closing the mold, injecting a heated thermoplastic molding composition into the closed mold, the mold being maintained at a temperature substantially less than the melting point of the plastic material injected into the mold, whereby the preformed textile fabric is directly bonded to the plastic material of the shell by the plastic material itself, the adhesion of the fabric to the plastic material being confined to the surface of the fabric adjoining the molded plastic material, the exposed surface of the fabric having the texture and appearance of the textile fabric.

2. A method as set forth in claim 1, wherein the heated thermoplastic molding composition is polypropylene, the temperature of the composition injected into the mold is approximately 535° F., and the temperature of the mold is approximately 115° F.

3. A method of making a textile fabric lined concavely shaped molded shell for luggage or the like comprising providing a mold assembly having a cavity to furnish the molded shell when the mold is closed, providing a preformed textile fabric conforming substantially in shape and dimensions to the inner side of the finished molded shell, positioning the preformed textile fabric in the mold and maintaining the fabric against the mold member of the assembly which furnishes the inner side of the finished shell, closing the mold, injecting a heated thermoplastic resin material into the closed mold, the mold being maintained at a temperature substantially less than the melting point of the plastic material injected into the mold, whereby the preformed textile fabric is directly bonded to the plastic material of the shell by the plastic material itself, the adhesion of the fabric to the plastic material being confined to the surface of the fabric adjoining the molded plastic material, the exposed surface of the fabric having the texture and appearance of a textile fabric.

4. A method as set forth in claim 3, wherein the heated thermoplastic molding composition is polypropylene, the temperature of the composition injected into the mold is approximately 535° F., and the temperature of the mold is approximately 115° F.

5. A method of making a textile fabric lined and textile fabric outer surface covered concavely shaped molded shell for luggage or the like comprising providing a mold assembly having a cavity to furnish the molded shell when the mold is closed, providing a preformed textile fabric conforming substantially in shape and dimensions to the inner side of the finished molded shell, positioning the preformed textile fabric in the mold and maintaining the fabric against the mold member of the assembly which furnishes the inner side of the finished shell, providing a preformed textile fabric conforming substantially in shape and dimensions to the outer side of the finished molded shell, positioning the preformed textile fabric in the mold and maintaining the fabric against the mold member of the assembly which furnishes the outer side of the finished shell, closing the mold, injecting a heated thermoplastic resin material into the closed mold through edge gates between said fabrics, the mold being maintained at a temperature substantially less than the melting point of the plastic material injected into the mold, whereby the preformed textile fabrics are directly bonded to the plastic material of the shell by the plastic material itself, the adhesion of each fabric to the plastic material being confined to the surface of the fabric adjoining the molded plastic material, the exposed surface of the fabrics having the texture and appearance of textile fabrics.

6. A method as set forth in claim 5, wherein the heated thermoplastic molding composition is polypropylene, the temperature of the composition injected into the mold is approximately 535° F., and the temperature of the mold is approximately 115° F.

7. A method as set forth in claim 6, wherein the fiber of the textile fabrics is polypropylene.

8. A method as set forth in claim 1, wherein the heated thermoplastic molding composition is polypropylene, and the fiber of the textile fabric is a polypropylene composition.

9. A method as set forth in claim 3, wherein the heated thermoplastic molding composition is polypropylene, and the fiber of the textile fabric is a polypropylene composition.

10. A method as set forth in claim 1 wherein the preformed textile fabric conforms substantially in shape and dimensions to the shape and dimensions of the outer side of the finished molded shell, and is positioned in the mold against the mold member of the assembly which furnishes the outer side of the finished shell.

11. A method as set forth in claim 10, wherein the heated thermoplastic molding composition is polypropylene, and the fiber of the textile fabric is a polypropylene composition.

References Cited by the Examiner

UNITED STATES PATENTS

| | | | |
|---|---|---|---|
| 2,377,393 | 6/1945 | Wiley | 264—257 X |
| 2,903,388 | 9/1959 | Jonke et al. | 264—261 |
| 3,057,016 | 10/1962 | Schilling | 264—328 |
| 3,096,146 | 7/1963 | Coale | 264—328 |

ROBERT F. WHITE, *Primary Examiner.*

A. H. BRODMERKEL, *Examiner.*

L. S. SQUIRES, T. J. CARVIS, *Assistant Examiners.*